United States Patent [19]

Ziech

[11] Patent Number: 5,267,489
[45] Date of Patent: Dec. 7, 1993

[54] DRIVE AXLE ASSEMBLY FOR USE IN TANDEM AXLE ARRANGEMENTS AND PINION SHAFT SUBASSEMBLY THEREFOR

[75] Inventor: James F. Ziech, Kalamazoo, Mich.

[73] Assignee: Eaton Corporation, Cleveland, Ohio

[21] Appl. No.: 894,383

[22] Filed: Jun. 4, 1992

[51] Int. Cl.[5] .............................................. F16H 37/06
[52] U.S. Cl. ................. 74/606 R; 475/332; 475/237; 475/230
[58] Field of Search ............. 74/606 R; 475/220, 221, 475/230, 237, 332

[56] References Cited

U.S. PATENT DOCUMENTS

| | | | |
|---|---|---|---|
| 2,064,262 | 12/1936 | Keese | 475/221 X |
| 2,693,244 | 11/1954 | Rockwell et al. | 475/221 X |
| 3,000,456 | 9/1961 | Christie | 475/22 X |
| 4,046,210 | 9/1977 | Nelson | 475/221 X |
| 4,050,534 | 9/1977 | Nelson et al. | 475/221 X |
| 4,207,780 | 6/1980 | Saxton | 475/221 X |
| 4,852,426 | 8/1989 | DeRees | 74/606 R X |

Primary Examiner—Leslie A. Braun
Assistant Examiner—Daniel Wittels
Attorney, Agent, or Firm—R. A. Johnston

[57] ABSTRACT

A drive axle assembly and subassembly for use in tandem driving axle arrangements has a removable drive pinion shaft subassembly. An input shaft is journalled in an axle housing and is coupled to an output shaft also journalled in the housing by an inter-axle differential for torque sharing of driveline power. An input gear receives power from the inter-axle differential and drives a countershaft gear mounted on the drive pinion shaft. The drive pinion shaft is journalled in primary and secondary bearings which straddle the countershaft gear and are mounted on a removable cage which substantially surrounds the countershaft gear. The drive pinion shaft with countershaft gear is assembled into the primary and secondary bearings on the cage and is shimmed between the bearings to form a pinion shaft and subassembly. A threaded nut is torqued over the end of the drive primary shaft to retain and preload the drive pinion shaft in the bearings. The cage has a peripheral mounting flange which permits the subassembly to be shimmed and bolted against the axle housing to locate the drive pinion on the axle ring gear. Upon installation of the subassembly into the axle housing, a drive pinion pilot shaft portion is journalled in a third bearing in the axle housing.

19 Claims, 2 Drawing Sheets

DRIVE AXLE ASSEMBLY FOR USE IN TANDEM AXLE ARRANGEMENTS AND PINION SHAFT SUBASSEMBLY THEREFOR

BACKGROUND OF THE INVENTION

The present invention relates to drive axles, and particularly those arrangements on a vehicle wherein plural drive axles are arranged in tandem. Tandem drive axle arrangements are commonly employed in heavy over-the-road trucks and off-the-road vehicles requiring the additional traction of plural driving axles. Typically, in heavy over-the-road trucks, the axle adjacent the powertrain driveshaft is the forward one of the tandem axles. In such arrangements, the forward drive axle has an input shaft connected to the vehicle power train driveshaft, and the axle has an axially coincident output shaft adapted for connection to the second trailing drive axle.

Axle arrangements of the aforesaid type usually employ an inter-axle differential between the axle input and output shaft, for transmitting driveshaft torque to both axles.

The upstream or forward drive axle in a tandem drive axle arrangement typically has a drive gear journalled on the input shaft receiving power from a power splitting inter-axle differential, which meshes with a countershaft gear attached to the axle drive pinion shaft with the drive pinion thereon engaging the axle ring gear. Heretofore, the countershaft or drive pinion shaft has been journalled with plural bearings to provide precision positioning of a drive pinion on the ring gear to minimize movement of the drive pinion with respect to the ring gear during power transmission.

Typically in heavy truck and off-the-road drive axles, the drive pinion shaft is journalled in bearings provided in a removable platform or block, with the countershaft gear cantilevered from the journals on the drive pinion shaft. The drive pinion typically has a pilot portion extending therefrom which is journalled in a bearing mounted on the axle housing upon which the ring gear and axle shafts are journalled.

Where the pinion shaft is journalled in a manner such that the countershaft gear is cantilevered from journals or bearings, problems have been encountered in providing adequate rigidity of the pinion shaft and for maintaining the precision positioning of the countershaft gear drive pinion with respect to the drive gear ring gear during high torque operation. Likewise, where the pinion shaft is journalled in a manner such that the drive pinion is cantilevered from journals or bearings, problems have been encountered in providing adequate rigidity during high torque operation.

Where the countershaft or pinion shaft has been mounted with the countershaft gear having journals supporting the countershaft on both sides of the countershaft gear, it has been difficult to provide for assembly of the overall drive axle assembly because the end journal for the countershaft was mounted in the cover or carrier housing portion of the axle assembly. This required complete assembly of the entire axle assembly in order to position the pinion shaft with respect to the ring gear and resulted in a costly and cumbersome assembly of the axle in high volume production.

It has therefore been desirable to find a way or means of supporting a drive axle countershaft for the drive pinion in a manner which does not leave the countershaft gear cantilevered from the bearings and which permits assembly of the countershaft and bearings into the axle housing for positioning the drive pinion with respect to a ring gear with a minimum number of bearings in a manner which permits ease of adjustment of the pinion position before the axle housing cover is installed.

SUMMARY OF THE INVENTION

The present invention provides a drive axle assembly of the type having a countershaft driven from the input shaft with the ring gear drive pinion mounted on the countershaft. An output shaft adapted for connection to a tandem driving axle is drivingly coupled, preferably with a differential, to the input shaft. The countershaft including the drive pinion and the countershaft gear is journalled on a removable pinion shaft cage with the countershaft bearings straddling the countershaft gear and the cage substantially surrounds the countershaft gear. The removable cage and pinion shaft subassembly has a pilot portion provided on the end of the pinion which is journalled in a pinion pilot bearing mounted to the axle housing proper. The cage or countershaft subassembly is held together by a nut threadedly received over the end of the countershaft which is torqued against shims provided between the bearings to provide the desired pinion shaft preload on its journals. The pinion shaft and cage subassembly is then shimmed in its mounting on the axle housing for positioning the pinion in the desired engagement with the ring gear on the axle.

The present invention thus provides a novel and improved technique for journalling a drive pinion countershaft which provides radial support for the shaft on both sides of the countershaft gear on a readily removable subassembly of pinion shaft and cage. Provision is made for journalling of the end of the drive pinion in a third bearing mounted on the axle housing. The subassembly of the pinion countershaft and bearing cage facilitates accurate and stable positioning of the pinion with respect to the axle ring gear.

DETAILED DESCRIPTION

Figure 1:
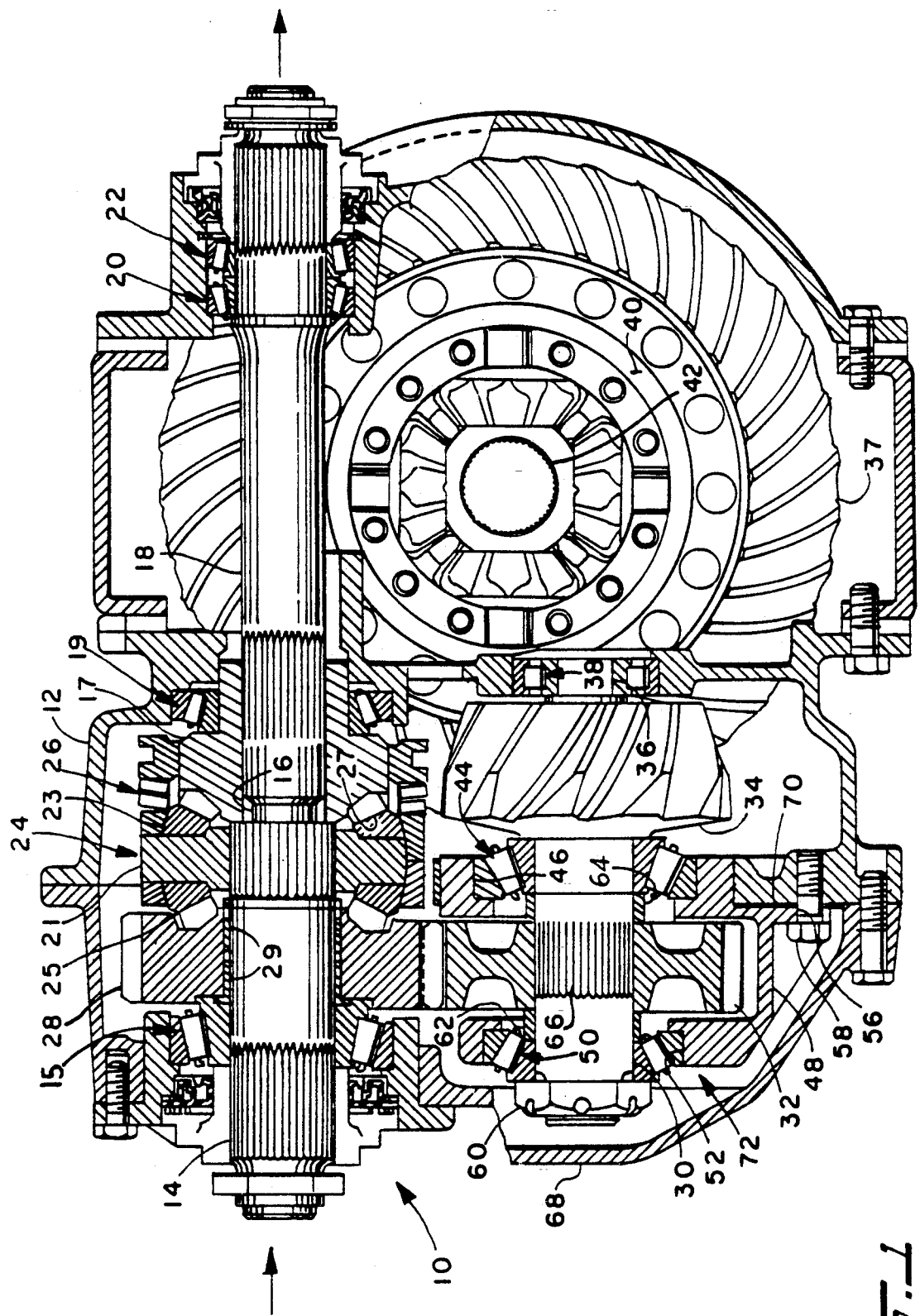
FIG. 1 is a transverse section view of the drive axle assembly of the present invention.

Referring to FIG. 1, the drive axle assembly is indicated generally at 10, and is of the type comprising the forward one of plural drive axles which are mounted in tandem on the vehicle.

Axle assembly 10 comprises an axle housing 12 having an input shaft 14 journalled therein a bearing indicated generally at 15 adjacent the input end thereof.

The opposite end of shaft 14 is journalled for rotation about a pilot portion 16 of an output shaft 18 disposed axially coincident with input shaft 14. Output shaft 18 has a gear 17 thereon at the forward end thereof, which gear 17 has its hub journalled in a bearing indicated generally at 19 provided in the housing 12. The opposite end of shaft 18 is journalled in a pair of bearings indicated generally at 20, 22 provided in the housing 12. The aft or rearward end of shaft 18 extends outwardly of the housing and has an end thereof adapted for attachment of a flange or yoke for driving a shaft extending to the rear tandem axle assembly.

A power-dividing means is provided in the form of an inter-axle differential, indicated generally at 24, disposed to provide driving connection between input shaft 14, drive axle 10 and output shaft 18. The differential 24 has a spider 21 splined on input shaft 14 and driven thereby. Spider 21 has a plurality of spider gears 23, each of which engages teeth 25 provided on the aft face of input gear 28 which is journalled on bearings 29 provided on shaft 14. Spider gears 23 also engage teeth 27 provided in the forward face of output shaft gear 17 for transferring power thereto.

The power-dividing differential may be locked by engagement of a sliding dog clutch indicated generally at 26. The use of a power-dividing inter-axle differential between input shaft 14, axle 10, and output shaft 18 and use of a clutch for lockup is well known in the art and further description thereof has been omitted for the sake of brevity.

A countershaft 30 is provided and is journalled in a manner which will hereinafter be described, and has a countergear 32 drivingly mounted thereon. A drive pinion 34 is also provided on shaft 30 and is disposed at one end thereof in axially spaced arrangement from countergear 32. Pinion 34 has a pilot shaft 36 formed in the end thereof which is journalled in a bearing indicated generally at 38, which is mounted in housing 12. Drive pinion 34, when positioned as hereinafter described, engages the axle ring gear 37 for propelling the vehicle. Ring gear 37 is typically attached to a differential carrier 40 which drives the vehicle axle 42 via a bevelled gear attached to the axle and spider gears engaging the axle bevel gear, as is well known in the art, and detailed description thereof will be omitted for the sake of brevity.

Figure 2:
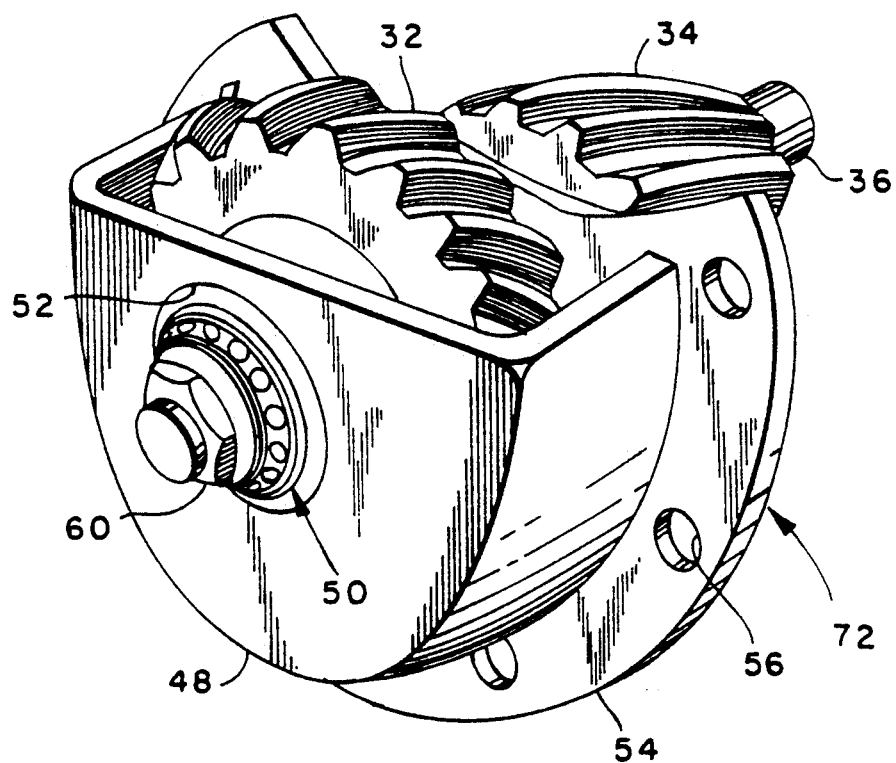
FIG. 2 is an axonometric view of the pinion shaft and cage subassembly of the drive axle of FIG. 1.

Referring to FIGS. 1 and 2, pinion countershaft 30 is journalled in a primary bearing indicated generally at 44 which is disposed intermediate countershaft gear 32 and the drive pinion 34 with the bearing 44 mounted in an aperture 46 formed in the cage 48. Cage 48 substantially surrounds the countergear 32 in closely spaced arrangement with controlled clearance thereabout to limit oil windage drag by allowing a lower dynamic oil level inside cage 48. A secondary bearing indicated generally at 50 is provided in which the end of the shaft 30 is journalled on the opposite side of countergear 32; and, bearing 50 is mounted in aperture 52 formed in the cage 48. Cage 48 has an outwardly extending peripheral mounting flange 54 formed thereabout radially outwardly from the end of the cage adjacent bearing 54. Flange 44 has a plurality of apertures 56 provided therein for receiving bolts 58 which thereby engage the housing 12.

The cage 48, shaft 30, including countergear 32, along with bearings 44,50 are retained on cage 48 by nut 60 threadedly engaged over the end of the pinion countershaft 30. Spacers which include suitable shims are provided between the bearings and preferably on opposite sides of gear 30 and are denoted by reference numerals 62 and 64 in FIG. 1.

In the presently preferred practice, bearings 44,50 are mounted in the cage and countershaft 30 is axially received through the bearings with gear 32 placed within the cage and shaft 30 engages the hub of gear 32 with suitable splines denoted by reference numeral 66. The appropriate spacers and shims are installed at the time shaft 30 is received through the bearing and the nut 60 installed and torqued to provide the desired preload on the pinion shaft bearings 44,50. The subassembly formed thereby is then inserted into the axle housing, with cover 68 removed and, is registered against the face of the axle housing by means of shims 70 as required to position the drive pinion 34 for appropriate engagement with ring gear 37. The cage and pinion shaft subassembly, indicated generally at 72 in FIG. 2 is thus assembleable into the axle housing, with the cover 68 removed, in a manner which permits ease of positioning of the pinion by the use of shims 70 and readily accessible attachment with bolts 58 to the axle housing. This arrangement permits accurate location of the drive pinion 34 with respect to the ring gear 37 by means of shins 70 and installation and registration of the assembly 72 by tightening the bolts 58 onto flange 54 for securing the assembly 72 into the housing. The cover portion 68 of the housing 12 may then be installed over the assembly 72.

The present invention thus provides a unique and novel driving axle assembly for tandem axle arrangements with a pinion shaft and countergear subassembly assembled and preloaded outside the axle housing. The subassembly may be readily installed and shimmed and retained in the axle housing for accurately locating the drive pinion into engagement with the ring gear. The present invention provides a low-cost, easy to manufacture and assemble, drive axle for use in heavy vehicle service.

Although the present invention has been described hereinabove with respect to the illustrated embodiments, it will be understood by those skilled in the art that the invention is capable of modification and variation, and is intended as limited in scope only by the following claims.

I claim:

1. A drive axle assembly for distributing torque from a main drive shaft between a drive axle and an output shaft adapted for connection to another drive axle, said assembly comprising:
   (a) housing means;
   (b) input shaft means journalled on said housing in driving engagement with said main drive shaft;
   (c) output shaft means journalled on said housing;
   (d) power-dividing means associated with said input shaft means, said power-dividing means including gear means being in driving engagement with said drive axle, said gear means including:
      (i) an input gear;
      (ii) a pinion shaft disposed in spaced generally parallel relationship with said input shaft and having thereon a drive pinion and a driven gear spaced from said pinion;
      (iii) an axle and ring gear means journalled on said housing and engaging said drive pinion and driven thereby;
      (iv) a pinion cage releasably mounted on said housing wherein said pinion cage is mounted on an interior portion of said housing and is completely surrounded by said housing;
      (v) a first and second pinion shaft bearing disposed on opposite sides of said driven gear, said first and second bearings mounted on said cage to form a pinion subassembly wherein said driven gear engages said input gear upon attachment of said subassembly to said housing;
   (e) third pinion shaft bearing means disposed on the side of said drive pinion opposite said first and second bearings, said third bearing means registered on said housing with the end of said pinion shaft journalled therein; and, (f) drive means operable to transmit torque from said input shaft means to said output shaft means.

2. The drive axle assembly defined in claim 1, wherein said power-dividing means includes differential means for torque splitting between said input gear and said output shaft means.

3. The drive axle assembly defined in claim 1, wherein said gear means input and driven gears are helical gears.

4. The assembly defined in claim 1, wherein said subassembly includes a nut threaded on the end of said pinion shaft remote from said pinion, and shims intermediate at one end of said first and second bearings and said driven gear, wherein rotation of said nut with respect to said pinion shaft is operative to preload said first and second bearings.

5. The axle assembly defined in claim 1, wherein said pinion shaft includes a pilot portion extending from the end face of said pinion; and, said third pinion shaft bearing has an inner race thereof secured to said pilot portion and an outer race slip-fit registered in said housing.

6. The axle assembly defined in claim 1, wherein said drive means includes differential means and lockup clutch means therefor.

7. A pinion shaft subassembly for a drive axle which is completely surrounded by housing means comprising:
(a) a cage member mounted on an interior portion of said housing means and having an open gear receiving cavity therein with a pair of aligned apertures disposed one each on opposite sides of said cavity and extending exteriorly of said cage;
(b) a pinion shaft having a pinion gear provided thereon adjacent one end thereof with a pilot portion extending from the end face thereof said pilot portion adapted to be journalled in a pilot bearing;
(c) primary bearing means having an inner race registered on said shaft adjacent said pinion gear remote from said pilot with an outer race registered in one of said cage apertures;
(d) a counter gear adapted for engaging an input gear and drivingly mounted on said pinion shaft adjacent said primary bearing; and,
(e) secondary bearing means having an inner race registered on said pinion shaft adjacent said counter gear with an outer race registered in the other of said pair of cage apertures;
(f) said cage member defining mounting surfaces thereon adapted for registration on a drive axle housing for positioning said pinion thereon; and
(g) retaining means operative to keep said shaft in said primary bearing and secondary bearing whereby the end of the pinion shaft, at the location of said secondary bearing means, is supported solely by said cage.

8. The subassembly defined in claim 7, wherein said mounting surfaces comprise a bolt-flange about the periphery of said cage.

9. The subassembly defined in claim 7, further comprising shim means disposed between said primary and secondary bearing means.

10. A pinion shaft subassembly for a drive axle which is completely surrounded by housing means comprising:
(a) a cage member mounted on an interior portion of said housing means and having a gear receiving cavity therein with a pair of aligned shaft-receiving bores formed therethrough, said cage having mounting portions provided about the periphery thereof;
(b) primary and secondary bearing means disposed one in each of said bores;
(c) shaft means journalled in said primary and secondary bearing means and extending through said cage, said shaft means having a drive pinion provided on one end thereof exteriorly of said cage and adjacent said primary bearing means, said drive pinion having pilot surfaces on the end thereof adapted for journalling in a pilot bearing;
(d) a counter gear drivingly received on said shaft means and disposed in said cavity between said primary and secondary bearing means; and,
(e) means retaining said shaft means journalled in said primary and secondary bearing means whereby the end of the pinion shaft, at the location of said secondary bearing means, is supported solely by said cage.

11. The subassembly defined in claim 10, further comprising shim means disposed between said driven gear and at least one of said primary and secondary bearing means.

12. The subassembly defined in claim 10, wherein said retaining means includes a nut threadedly engaging the end of said shaft means remote from said drive pinion.

13. A drive axle assembly of the type adapted for tandem axle arrangements driving from a mainshaft comprising:
(a) axle housing means having an input shaft journalled therein adapted for connection to said main shaft and having an output shaft journalled in said housing means and adapted for connection to a second driving axle;
(b) drive power-dividing means operative to transmit torque between said input shaft and said output shaft;
(c) input gear means mounted to receive power also from said power-dividing means on one of said input and output shafts;
(d) a countershaft having a gear drivingly mounted thereon andengaging said input gear means, said countershaft having a drive pinion thereon for engaging an axle ring gear, with a pilot portion extending from said drive pinion, said countershaft journalled in a pair of bearings disposed to straddle said counter gear:
(e) pinion cage means having said pair of bearing mounted thereon with said cage means substantially surrounding said counter gear, said cage means removably mounted on an interior portion and being completely surrounded by said axle housing means for positioning said drive pinion thereon;
(f) retainer means keeping said countershaft journalled in said pair of bearings; and,
(g) pilot bearing means journalling said pilot portion of said countershaft on said axle housing means, wherein said retainer means forms a removable subassembly composed of said cage means, said countershaft including said gear and drive pinion and said pair of bearings whereby one of said pair of bearings is on an end of said countershaft opposite said pilot portion of said countershaft, and adjacent said gear, and is solely supported by said pinion cage means.

14. The assembly defined in claim 13, wherein said retainer means comprises a nut threadedly engaging the end of said countershaft.

15. The drive axle assembly defined in claim 13, further comprising shim means between said counter gear and at least one of said pair of bearing means.

16. The drive axle assembly defined in claim 13, wherein said power-dividing means includes inter-axle differential means.

17. The drive axle assembly defined in claim 13, wherein said input gear means and said countershaft gear have helically patterned teeth.

18. The drive axle assembly defined in claim 13, wherein said drive pinion is integrally formed on said countershaft.

19. The drive axle assembly defined in claim 13, wherein said pinion cage means substantially surrounds said countershaft gear in closely spaced arrangement.

* * * * *